(12) United States Patent
Becker et al.

(10) Patent No.: US 7,777,668 B2
(45) Date of Patent: Aug. 17, 2010

(54) RADAR ALTIMETER WITH FORWARD LOOKING RADAR AND DATA TRANSFER CAPABILITIES

(75) Inventors: Robert C. Becker, Eden Prairie, MN (US); Alan G. Cornett, Andover, MN (US); David W. Meyers, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 140 days.

(21) Appl. No.: 12/099,297

(22) Filed: Apr. 8, 2008

(65) Prior Publication Data
US 2009/0251358 A1 Oct. 8, 2009

(51) Int. Cl.
G01S 13/00 (2006.01)

(52) U.S. Cl. ............ 342/59; 342/65; 342/120; 342/179

(58) Field of Classification Search ............ 342/59, 342/65, 120, 179
See application file for complete search history.

(56) References Cited

U.S. PATENT DOCUMENTS

| 2,630,283 | A | | 3/1953 | Hanson |
|---|---|---|---|---|
| 3,185,984 | A | | 5/1965 | Child et al. |
| 3,206,745 | A | | 9/1965 | Waters |
| 3,277,467 | A | | 10/1966 | Barney |
| 3,315,255 | A | | 4/1967 | Sullivan et al. |
| 3,373,423 | A | | 3/1968 | Levy |
| 3,396,391 | A | | 8/1968 | Anderson et al. |
| 3,467,961 | A | | 9/1969 | Follen et al. |
| 4,321,601 | A | * | 3/1982 | Richman ............ 342/25 C |
| 5,047,779 | A | * | 9/1991 | Hager ............ 342/120 |
| 5,835,059 | A | | 11/1998 | Nadel et al. |
| 5,952,961 | A | | 9/1999 | Denninger |
| 6,545,631 | B2 | | 4/2003 | Hudson et al. |
| 6,606,034 | B1 | | 8/2003 | Muller et al. |
| 6,750,807 | B1 | | 6/2004 | Hager et al. |
| 6,753,806 | B1 | | 6/2004 | Hager et al. |
| 6,897,803 | B2 | | 5/2005 | Hagar et al. |
| 7,026,987 | B2 | | 4/2006 | Lokshin et al. |

(Continued)

FOREIGN PATENT DOCUMENTS

EP 0475181 3/1992

(Continued)

OTHER PUBLICATIONS

Blake, T.M., "Development of a Rapidly Re-Deployable HF Radar Concept", "www.emrsdtc.com", 2004, Publisher: 1st EMRS DTC Technical Conference, Published in: Edinburgh.

(Continued)

Primary Examiner—Thomas H Tarcza
Assistant Examiner—Timothy A Brainard
(74) Attorney, Agent, or Firm—Fogg & Powers LLC (57) ABSTRACT

A navigation system having a radar altimeter is disclosed. The navigation system comprises a signal processing unit and one or more antennas in operative communication with the radar altimeter and the signal processing unit. The system further comprises a forward looking radar communicatively coupled to the radar altimeter. The forward looking radar and the signal processing unit are configured to provide forward looking radar measurements, radar altitude measurements from the radar altimeter, and datalink communications within a single forward looking radar scanning sequence.

20 Claims, 7 Drawing Sheets

U.S. PATENT DOCUMENTS

| | | | |
|---|---|---|---|
| 2003/0184450 A1 | 10/2003 | Muller et al. | |
| 2004/0181318 A1 | 9/2004 | Redmond et al. | |
| 2005/0040280 A1* | 2/2005 | Hua | 244/3.1 |
| 2007/0001900 A1 | 1/2007 | Heppe et al. | |
| 2007/0018883 A1* | 1/2007 | Hester et al. | 342/92 |
| 2007/0146195 A1* | 6/2007 | Wallenberg et al. | 342/52 |
| 2007/0274415 A9* | 11/2007 | Brown et al. | 375/320 |
| 2009/0138138 A1* | 5/2009 | Ferren et al. | 701/3 |

FOREIGN PATENT DOCUMENTS

| | | |
|---|---|---|
| GB | 522890 | 7/1940 |

OTHER PUBLICATIONS

Marsh, George, "Typhoon: Europe'S Finest", "www.aviationtoday.com", Jun. 1, 2003, pp. 4-11, Publisher: Avionics Magazine, Published in: USA.

Slimsens, "Short and Long Range Integrated Multifunction Radar and Communication Sensors", "www.foresightvehicle.org.uk", , Publisher: Slimsens Vehicle Radar & Communications, Published in: GB.

* cited by examiner

RADAR ALTIMETER WITH FORWARD LOOKING RADAR AND DATA TRANSFER CAPABILITIES

CROSS REFERENCE TO RELATED APPLICATION

This application is related to commonly assigned U.S. patent application Ser. No. 10/459,139 (U.S. Pat. No. 6,897, 803), filed on Jun. 11, 2003 and entitled "RADAR ALTIMETER WITH FORWARD RANGING CAPABILITIES" (the '803 application). The '803 application is incorporated herein by reference in its entirety.

BACKGROUND

Proper navigation of an aircraft in all phases of flight is based primarily on an ability to identify any terrain features over which the aircraft is passing, and further based on the ability to determine a position of the aircraft. In this regard, aircraft instrumentation, including navigational sensors, radar systems, and specifically, radar altimeters are used in combination with accurate electronic terrain maps. The electronic terrain maps provide the height of objects on the map, and together with the radar altimeter aid in the flight and the planning of a flight path for the aircraft. As such, radar altimeters are commonly implemented within aircraft.

The typical aircraft radar altimeter includes a transmitter for applying pulses of electromagnetic energy at regular intervals to an antenna which then radiates the energy, in the form of a transmit beam, towards the Earth's surface. The radar altimeter further includes a signal receiver which receives return pulses, sometimes referred to as an echo or a return signal. For example, the return pulses that are received at an antenna receiver of the radar altimeter constitute radar transmission beams that have been reflected from the Earth's surface.

Military aircraft will frequently fly at very low altitudes to avoid detection. Flying at these very low altitudes dramatically increases a probability that the aircraft will collide with terrain objects (for example, buildings, mountains, or the side of a cliff). Standard aircraft radar altimeters that are designed to provide vertical altitude are largely incapable of detecting objects that are in a forward range of a known or desired flight path. Moreover, the electronic terrain maps often lack adequate resolution for safe flight at very low altitudes and are updated so infrequently that any obstacle less than 30 days old is unlikely to appear on the map.

In addition, emerging communications standards have made available a wealth of information that is of value to a pilot. This is particularly so for military pilots where delays in receiving information often means lost opportunities or casualties. For known applications where radar altimeters are utilized, radar functions and datalink communications functions are performed by separate transmitting and receiving devices, if the datalink function is available at all. While radars and datalink communications equipment incorporate separate transmitting and receiving devices, they are typically operated in separate frequency bands, each including separate antenna systems. Typically, space is at a premium for very small aircraft and even more so for helicopters. Since a radar altimeter is a mandatory item for any military aircraft and many civilian aircraft, the additional space required for a datalink transceiver typically rules out having the datalink receiver onboard.

For the reasons stated above and for other reasons stated below which will become apparent to those skilled in the art upon reading and understanding the present specification, there is a need in the art for a radar altimeter with forward looking radar and data transfer capabilities.

SUMMARY

The following specification provides for a radar altimeter with forward looking radar and data transfer capabilities. This summary is made by way of example and not by way of limitation. It is merely provided to aid the reader in understanding some aspects of at least one embodiment described in the following specification.

Particularly, in one embodiment, a navigation system having a radar altimeter is provided. The navigation system comprises a signal processing unit and one or more antennas in operative communication with the radar altimeter and the signal processing unit. The system further comprises a forward looking radar communicatively coupled to the radar altimeter. The forward looking radar and the signal processing unit are configured to provide forward looking radar measurements, radar altitude measurements from the radar altimeter, and datalink communications within a single forward looking radar scanning sequence.

BRIEF DESCRIPTION OF THE DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

Embodiments disclosed herein relate to a radar altimeter with forward looking radar and data transfer capabilities that combine multiple avionics communications functions into a single radar altimeter or similar electronic navigational device. In at least one embodiment, the radar altimeter discussed here comprises a signal processing unit configured to provide conventional altitude measurements, a forward-looking radar measurement capability, and a general-purpose datalink communications system within an active altitude scan region of the forward looking radar. For example, in at least one embodiment, the radar altimeter comprises a forward-looking terrain obstacle detection radar, a conventional radar altimetry function, and a datalink transceiver mounted in a helicopter or similar aircraft. In a similar embodiment, the datalink transceiver comprises at least a portion of the radar altimeter radio-frequency (RF) circuitry.

The radar altimeter considered herein typically has a low altitude update rate. In certain applications, the low update rate means that the radar altimetry function is mostly idle, thereby allowing potential use for other functions during this idle time. This idle or off-state of the radar altimetry function produces a window of opportunity for the radar altimeter to be used for different functions. For example, communications data can be interleaved in the same radar signal provided by the radar altimetry function during the off-states of both the forward-looking radar measurements and the altitude measurements.

In one embodiment, the signal processing unit of the radar altimeter is modified to process both the radar returns from the altitude antennas as well as the radar return data from the forward-looking radar. In one implementation, the radar return data comprises a three-dimensional video image from a near stand-alone forward looking radar system. In a similar implementation, the radar altimeter antenna connections can be switched to drive a frequency converter-based forward looking radar. In any of these implementations, the signal processing unit of the radar altimeter converts the radar return data to distance-to-ground or distance-to-target measurements.

The forward-looking radar portion of the radar altimeter discussed herein detects objects that pose a hazard to the helicopter, such as cables, trees, or elevated terrain, similar to the radar altimeter disclosed in the '803 application. In one implementation, the radar altimeter provides a timely warning of the collision danger with these objects to avoid any loss of the helicopter and helicopter crew.

The datalink transceiver portion of the radar altimeter allows the helicopter to transmit and receive communications data from (for example) ground and aerial surveillance devices such as an unattended ground sensor (UGS), unattended ground vehicles (UGVs), or unattended aerial vehicles (UAVs). In one implementation, the communications data is integrated into a single data stream and issued from the helicopter over the same data connection previously used exclusively for the altitude information for the radar altimeter. In a similar implementation, the datalink transceiver portion further comprises an Ethernet connection operable to send and receive altitude information, forward looking radar data, and datalink data, eliminating any need for additional cabling or enclosures to support the forward navigation and data transfer capabilities of the radar altimeter discussed herein.

Figure 1:
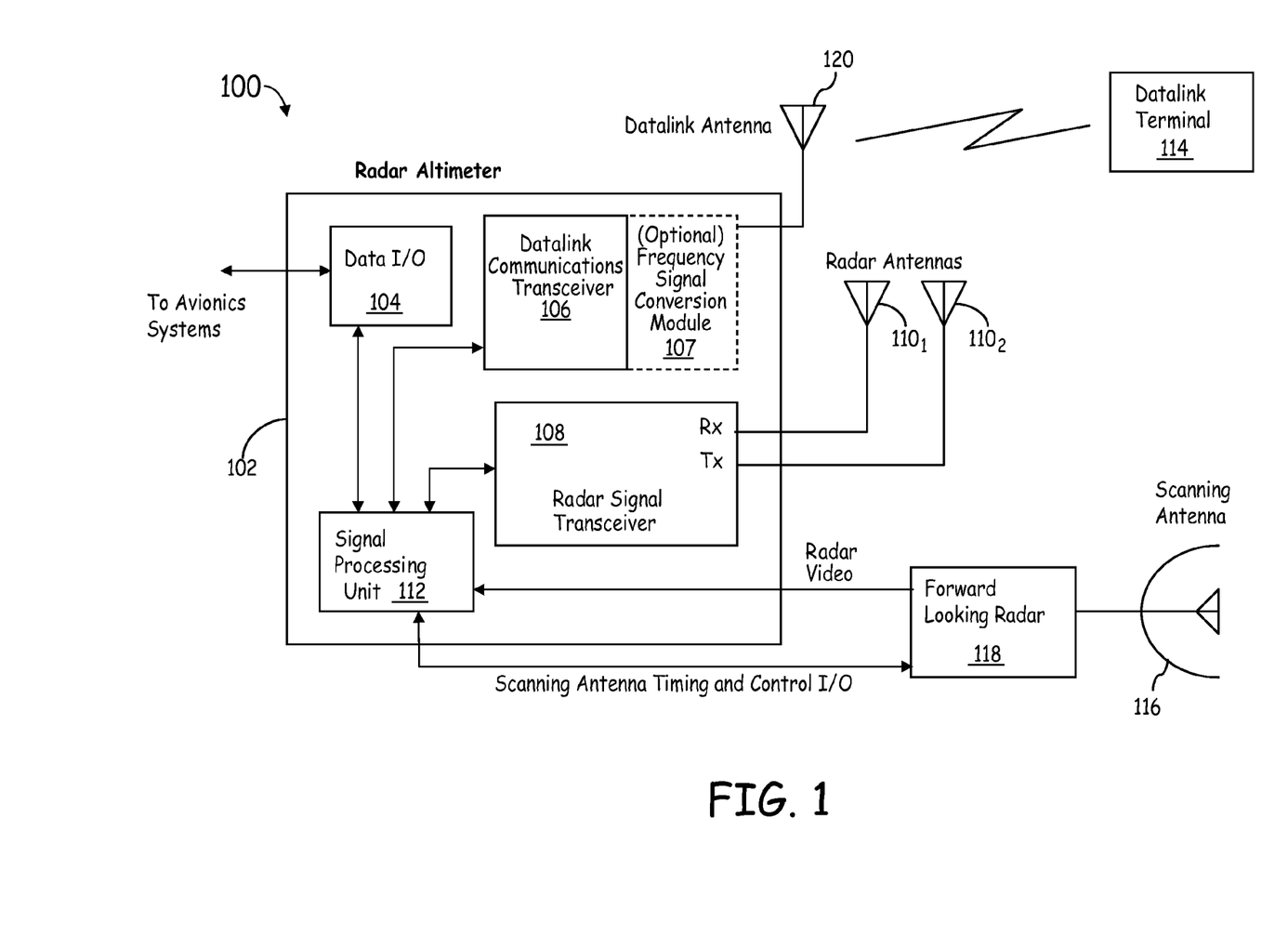
FIG. 1 is a block diagram of an embodiment of a system having a radar altimeter with forward looking radar and data transfer capabilities.

FIG. 1 is a block diagram of an embodiment of a system 100 having a radar altimeter with forward looking radar and data transfer capabilities. The system 100 comprises at least a radar altimeter 102 having a radar signal transceiver 108 in communication with a signal processing unit 112, along with a forward looking radar 118 communicatively coupled to the radar altimeter 102. In the example embodiment of FIG. 1, the forward looking radar 118 includes a scanning antenna 116. The system 100 further comprises at least one datalink antenna 120 and one or more radar antennas 110 (for example, radar antennas $110_1$ and $110_2$). The at least one datalink antenna 120 is communicatively coupled to a datalink communications transceiver 106 having an (optional) frequency signal conversion module 107 (discussed in further detail below with respect to FIG. 3). The radar antennas $110_1$ and $110_2$ are in operative communication with the radar altimeter 102. It is understood that in alternate implementations, the at least one datalink antenna 120 and the radar antennas $110_1$ and $110_2$ comprise a single antenna apparatus in operative communication with the radar altimeter 102. As shown in FIG. 1, a datalink terminal 114 provides at least one originating or terminating source for datalink communications between the system 100 and the datalink terminal 114. The datalink terminal 114 comprises at least one of a surveillance device such as a UGS, a UGV, or a UAV.

The radar altimeter 102 further comprises a data input/output (I/O) module 104 in operative communication with the signal processing unit 112. In one implementation, the data I/O module 104 is communicatively coupled to at least one avionics system operable in an aircraft. As further shown in FIG. 1, the signal processing unit 112, in addition to processing radar altitude data, is configured to process radar and antenna control and timing information and configurations between the forward looking radar 118 and the radar altimeter 102. For example, in one embodiment, a scanning antenna timing and control I/O signal comprises instructions for setting the antenna azimuth and elevation scan angle limits and, in addition, receiving current antenna azimuth and elevation angle information from the scanning antenna 116 in near real time.

In operation, the forward looking radar 118 and the signal processing unit 112 are configured to provide altitude and communications data at the end of a single forward looking radar azimuth scan when the forward looking radar 118 is inactive. In one implementation, radar altitude and data communication occurs when the forward looking radar 118 is not in use. In one implementation, the forward looking radar 118 and the signal processing unit 112 provide the data communication function interleaved with the altitude function of the radar altimeter 102 at a single operating frequency. As further discussed below with respect to FIG. 3, the signal processing unit 112 receives a video input signal from the forward looking radar 118. In one implementation, the video input signal provides at least one three-dimensional video image from a near stand alone forward looking radar 118.

In one embodiment, for example, the forward looking radar 118 and the signal processing unit 112 provide a datalink transfer during at least a portion of a radar scanning area of the forward looking radar 118 where the forward looking radar 118 is inactive and does not contribute to generation of the three-dimensional video image. In a similar embodiment, the signal processing unit 112 sends and receives radar signals for altitude measurements from the one or more radar antennas 110 via the radar signal transceiver 108 at a particular frequency (for example, 4.3 GHz). In one implementation, at least one of the antennas 110 (for example, the antenna $110_1$) operates as a radar altimeter transmit antenna and the antenna $110_2$ operates as a radar altimeter receive antenna. In a similar implementation, each of the antennas $110_1$ and $110_2$ are combined into a single antenna 110 that serves as both the transmit and receive antenna for the radar altitude measurement function. As discussed in further detail below with respect to FIG. 3, the system 100 transmits at least one of the interpreted radar signals from the signal processing unit 112 to the avionics system of an aircraft.

Figure 2:
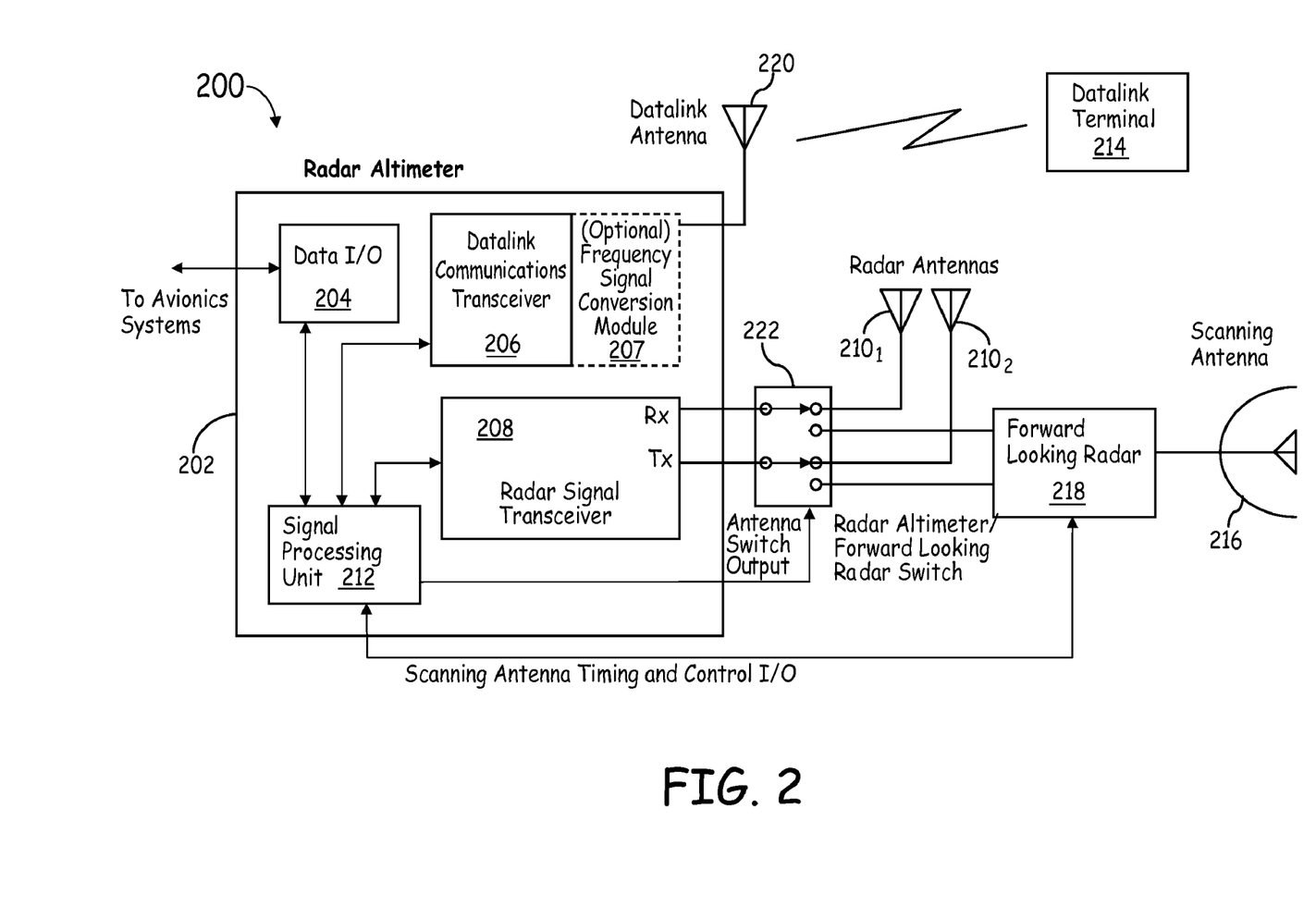
FIG. 2 is a block diagram of an embodiment of a system having a radar altimeter with forward looking radar and data transfer capabilities.

FIG. 2 is a block diagram of an embodiment of a system 200 having a radar altimeter with forward looking radar and data transfer capabilities. The system 200 comprises at least a radar altimeter 202 having a signal processing unit 212, and a forward looking radar 218 communicatively coupled to the radar altimeter 202. In the example embodiment of FIG. 2, the forward looking radar 218 includes a scanning antenna 216. The system 200 further comprises at least one datalink antenna 220 and one or more radar antennas 210 (for example, radar antennas $210_1$ and $210_2$). The at least one datalink antenna 220 is communicatively coupled to a datalink communications transceiver 206 having an (optional) frequency signal conversion module 207 (discussed in further detail below with respect to FIG. 4). The radar antennas $210_1$ and $210_2$ are in operative communication with the radar altimeter 202 via a radar signal transceiver 208. The radar signal transceiver 208 is in operative communication with the signal processing unit 212. Similar to the system shown in FIG. 1, a datalink terminal 214 provides at least one originating or terminating source for datalink communications between the system 200 and the datalink terminal 214.

The radar altimeter 202 further comprises a data I/O module 204 in operative communication with the signal processing unit 212. In one implementation, the data I/O module 204 is communicatively coupled to at least one avionics system operable in an aircraft. Similar to the system 100 of FIG. 1, the signal processing unit 212 sends and receives antenna control and timing data and configurations between the forward looking radar 218 and the radar altimeter 202 using a timing and control I/O signal.

The system 200 further comprises a radar scanning switch 222 communicatively coupled between the radar signal transceiver 208, the forward looking radar 218, and the one or more radar antennas 210. The radar scanning switch 222 is operable to switch signal connections between the one or more radar antennas 210 and the forward looking radar 218. For example, and as further discussed below with respect to FIG. 7, the signal processing unit 212 sends a control signal instruction to the radar scanning switch 222 to switch between the one or more radar antennas 210 and the forward looking radar 218 based on a prescribed sequence of operating states. In one implementation, in a first state, the signal processing unit 212 provides one of radar altimetry data and, in the second state, the signal processing unit 212 performs one of an uplink or downlink communication data transfer from the datalink terminal 214.

Similar in operation to the system 100, the forward looking radar 218 and the signal processing unit 212 provide altitude and communications data within a single forward looking radar scanning sequence. For example, the forward looking radar 218 and the signal processing unit 212 provide the altitude and communications data within at least one inactive period of a scan interval of the forward looking radar scanning antenna 216 at a single frequency bandwidth.

Figure 3:
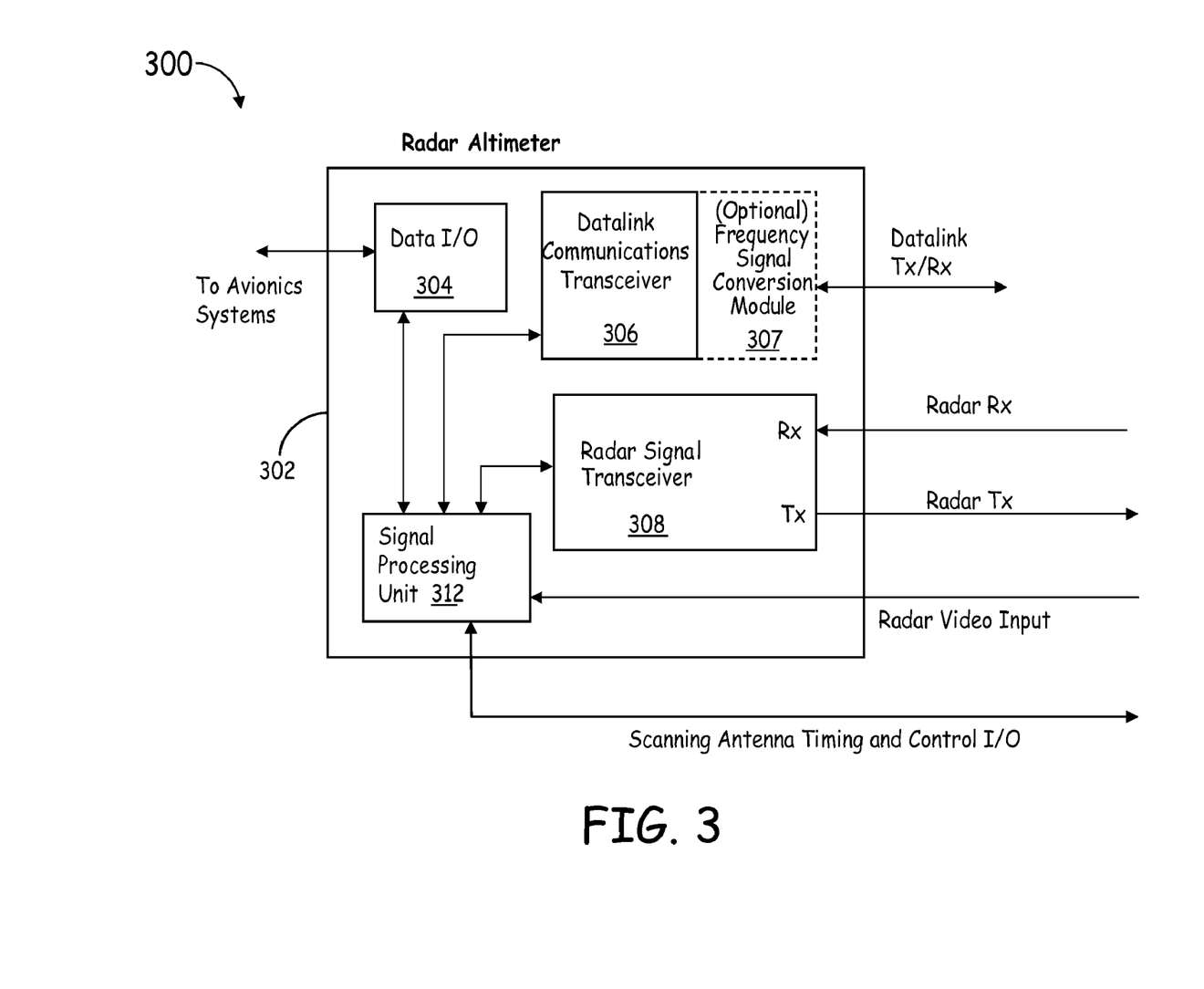
FIG. 3 is a block diagram of an embodiment of a radar altimeter with forward looking radar and data transfer capabilities.

FIG. 3 is a block diagram of an embodiment of a radar altimeter 302 with forward looking radar and data transfer capabilities, indicated generally at 300. In one embodiment, the radar altimeter 302 is representative of the radar altimeter 102 of FIG. 1. The radar altimeter 302 comprises a data I/O module 304 in operative communication with a signal processing unit 312. In the example embodiment of FIG. 3, the signal processing unit 312 comprises at least one of a microprocessor, a microcontroller, a field-programmable gate array (FPGA), a field-programmable object array (FPOA), a programmable logic device (PLD), or an application-specific integrated circuit (ASIC).

The radar altimeter 302 further comprises a datalink communications transceiver 306 and a radar signal transceiver 308, each of which are in operative communication with the signal processing unit 312. The datalink communications transceiver 306 provides the communications data during at least a portion of the forward looking radar scanning area that is inactive or outside a viewing angle range of the forward ranging navigation portion of the radar altimeter 302. The radar signal transceiver 308 receives radar return signals from one or more radar antennas (for example, the radar antennas 110 of FIG. 1) for interpretation by the signal processing unit 312. The radar signal transceiver 308 transmits at least one of the received radar return signals to the signal processing unit 312 as an altitude measurement. In one embodiment, the datalink communications transceiver 306 further comprises a frequency signal conversion module 307. In one implementation, the frequency signal conversion module 307 is an optional module operable to provide at least one form of communications data channel frequency adjustment for a communications data interface of the datalink communications transceiver 306. For example, if the communications data bandwidth of the radar altimeter 302 is too low, the frequency signal conversion module 307 shifts a datalink frequency of the datalink communications transceiver 306 out of the radar frequency band. Moreover, if the datalink frequency is outside the radar altimeter frequency band of the radar altimeter 300 and outside the frequency band of a forward looking radar (for example, the forward looking radar 118 of FIG. 1), then there is no need to interleave data communications with the forward looking radar scans. In this example, the amount of data, know as the data bandwidth of the datalink communications transceiver 206 is substantially increased over the data bandwidth of the datalink when it is interleaved between forward looking radar scans and altitude measurements.

In operation, the signal processing unit 312 initializes a forward looking radar scan for the radar altimeter 302. In one embodiment, the signal processing unit 312 determines at least one operating state for the forward looking radar scan of the forward looking radar portion of the radar altimeter 302 providing the radar altitude signals to the radar signal transceiver 308. The datalink communications transceiver 304 performs at least one datalink transaction where data is exchanged with an external datalink terminal (for example, the datalink terminal 114 of FIG. 1) and the radar signal transceiver 308 performs at least one radar altitude measurement during the forward looking radar scan. For example, in one implementation, the radar signal transceiver 308 receives the radar measurements with the datalink communication in an interleaved radar return signal within at least one frequency band.

In the example embodiment of FIG. 3, the signal processing unit 312 receives a video input signal from the forward looking radar 118 of FIG. 1. The video input signal provides at least one three-dimensional video image for a near stand alone forward looking radar operating sequence within the radar scanning sequence. In one implementation, three-dimensional video images from the near stand alone forward looking radar provide a plurality of surveillance images that are used for safe navigation of the aircraft.

Figure 4:
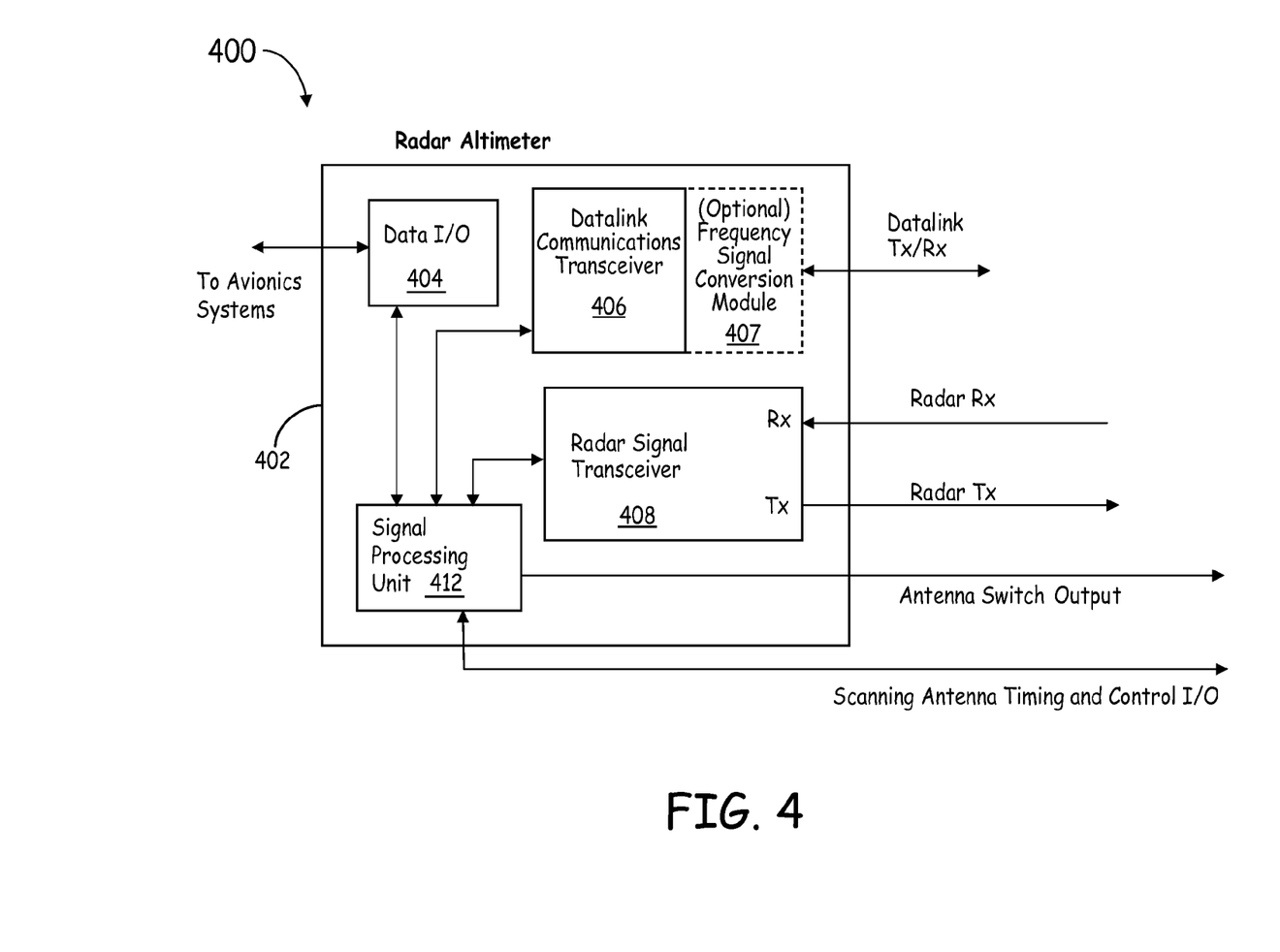
FIG. 4 is a block diagram of an embodiment of a radar altimeter with forward looking radar and data transfer capabilities.

FIG. 4 is a block diagram of an embodiment of a radar altimeter 402 with forward looking radar and data transfer capabilities, indicated generally at 400. In one embodiment, the radar altimeter 402 is representative of the radar altimeter 202 of FIG. 2. The radar altimeter 402 comprises a data I/O module 404 in operative communication with a signal processing unit 412. In the example embodiment of FIG. 4, the signal processing unit 412 comprises at least one of a microprocessor, a microcontroller, a field-programmable gate array (FPGA), a field-programmable object array (FPOA), a programmable logic device (PLD), or an application-specific integrated circuit (ASIC).

The radar altimeter 400 further comprises a datalink communications transceiver 406 and a radar signal transceiver 408, each of which are in operative communication with the signal processing unit 412. The datalink communications transceiver 406 provides the communications data from at least a portion of a forward looking radar scanning area when a forward looking radar is inactive (for example, the forward looking radar 218 of FIG. 2). The radar signal transceiver 408 receives radar signals from one or more radar antennas (for example, the radar antennas 210 of FIG. 2) for interpretation by the signal processing unit 412. In one embodiment, the datalink communications transceiver 406 further comprises a frequency signal conversion module 407, similar to the frequency signal conversion module 307 of FIG. 3.

Similar in operation to the radar altimeter 302 of FIG. 3, the signal processing unit 412 initializes a scanning pattern for the radar altimeter 402. In one embodiment, the signal processing unit 412 determines at least one operating state for an altitude measurement during a scan of the forward looking radar portion of the radar altimeter 402 providing the radar signals to the radar signal transceiver 408. The radar signal transceiver 408 and the datalink communications transceiver 406 continually receive at least one of radar measurements and communications data based on a radar scanning sequence for the at least one operating state of the radar altimeter 402. For example, the radar signal transceiver 408 receives the radar altitude measurements with the datalink communication on an interleaved basis within at least one frequency bandwidth.

In the example embodiment of FIG. 4, and referring back to the example embodiment of FIG. 2, the signal processing unit 412 receives at least one sequence of radar signals for the frequency converter-based forward looking radar 218 based on switching signal connections of the radar scanning switch 222 between the radar altimeter 402 and the forward looking radar 218. In one implementation, the signal processing unit 412 issues an "Antenna Switch Output" control signal to the radar scanning switch 222 based on a desired type of radar measurement. For example, the "Antenna Switch Output" control signal instructs the radar antenna switch 222 to switch between the one or more radar antennas 210 and the forward looking radar 218.

Figure 5:
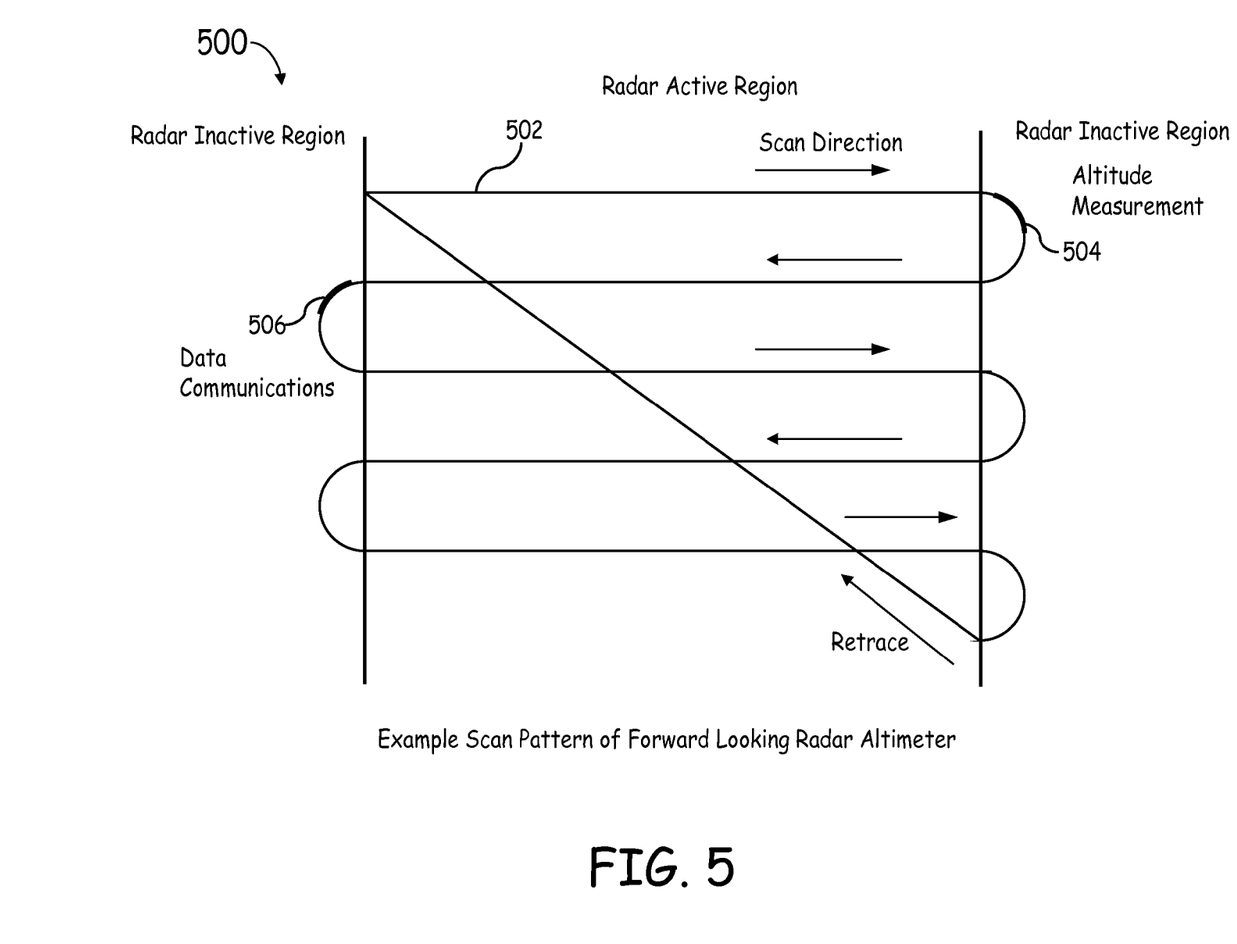
FIG. 5 is an embodiment of an antenna scan pattern of a forward looking radar.

FIG. 5 is an embodiment of a simplified antenna scan pattern 500 of a forward looking radar. The antenna scan pattern 500 illustrates an interleaving of the sample altitude measurement with the communications data on a radar scan 502 of the radar altimeter 302 (402) of FIG. 3 (FIG. 4). For example, and referring back to the radar altimeters of FIGS. 3 and 4 and the navigation systems of FIGS. 1 and 2, the radar altimeter 302 (402) receives the altitude measurement during an interval 504 interleaved with a datalink transfer at reference numeral 506. In one implementation, an antenna and timing input to the signal processing unit 312 (412) provides information to the signal processing unit 312 (412) regarding the antenna azimuth and elevations angles. When the antenna is at the end of a scan (that is, after an active scan portion of the radar scan 502) and reversing direction as shown in FIG. 5, referred to herein as an inter-scan interval, the radar altimeter 302 (402) performs a height-above-ground altitude measurement and a datalink communications transfer in an inactive scan portion of the radar scan 502. In one embodiment, the scanning interval occurs about 6 to 10 times per second. As discussed in further detail below with respect to FIGS. 6 and 7, during the inactive scan portion, an output of the datalink communications transceiver 306 (406) is provided to the signal processing unit 312 (412) where the received communications data is formatted in the signal processing unit 312 (412) for transmission from the radar altimeter 302 (402).

Figure 6:
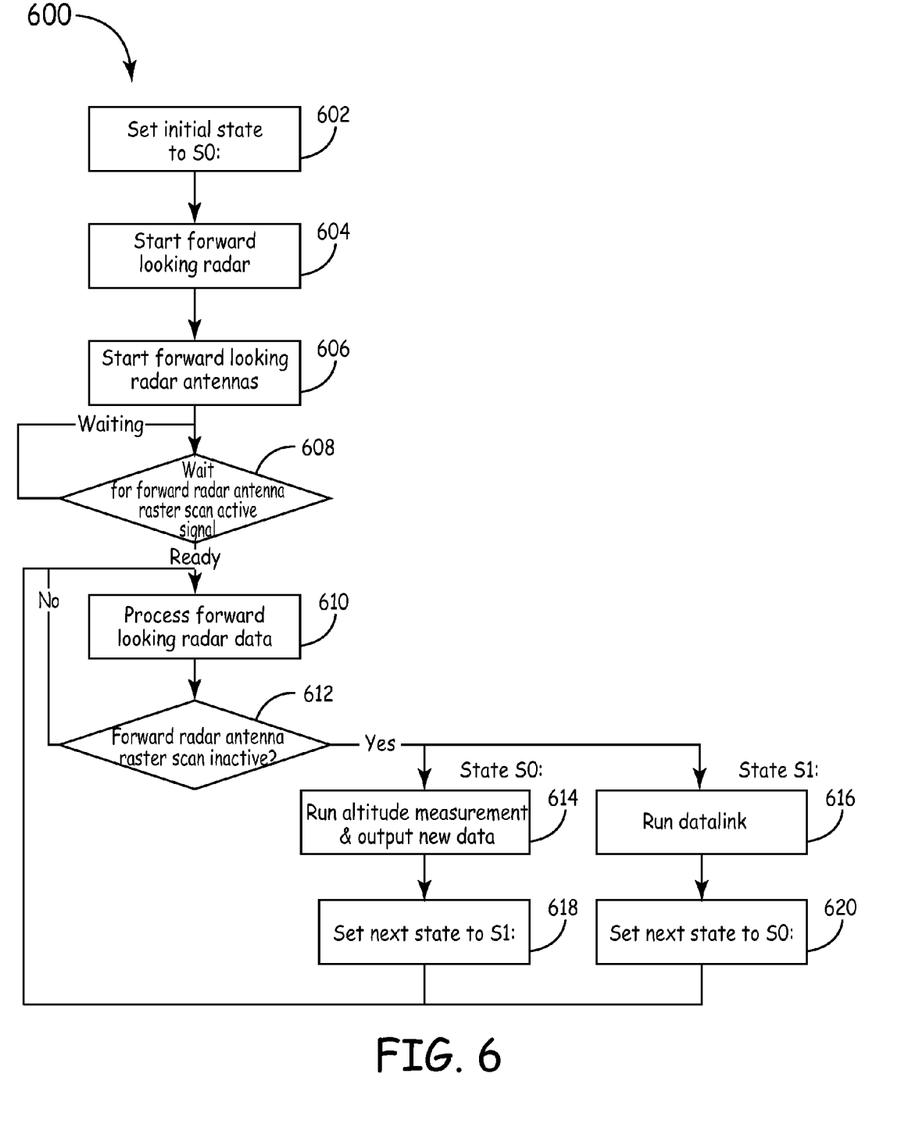
FIG. 6 is a flow diagram of an embodiment of a method for providing an aircraft with datalink communications and forward looking radar navigation.

FIG. 6 is a flow diagram of a method 600 for providing an aircraft with datalink communications and forward looking radar navigation. The method 600 addresses initializing a forward looking radar scan on an electronic navigation device associated with the aircraft, the electronic navigation device having at least a datalink communications transceiver, a radar altimeter, and a forward looking radar. The method 600 further addresses determining at least one operating state for the forward looking radar scan. When the forward looking radar scan is in an inactive state, the method 600 performs at least one of an altitude measurement of the aircraft and a datalink transfer between the aircraft and at least one datalink source. In the method of FIG. 6, the electronic navigation device receives a video input signal from the forward looking radar. The video input signal provides at least one three-dimensional video image during an active state of the forward looking radar scan.

For example, at an initial state S0 (block 602), the method 600 starts the forward looking radar (block 604) and an associated forward looking radar antenna (block 606). The method 600 will wait until a forward radar antenna raster scan active signal is received by a signal processing unit associated with the electronic navigation device (block 608). For example, once the forward radar antenna raster scan active signal provides a "Ready" signal, the method 600 processes the forward looking radar data (block 610). The method 600 processes the forward looking radar data until a forward radar raster scan inactive signal is issued (block 612).

In one implementation, at state S0, the method 600 transmits and receives radar altitude signals from one or more radar antennas for interpretation by the signal processing unit as a sample altitude measurement of the aircraft (block 614). The state S0 is set to state S1 at block 618 before the method 600 returns to process additional forward looking radar data at block 610. With the electronic navigation device in the S1 operating state, the method 600 performs the datalink transfer (block 616). In one implementation, the electronic navigation device provides at least one form of frequency conversion to accommodate datalink messages at multiple frequencies between the at least one datalink source and the electronic navigation device during the datalink transfer. At this point in the process depicted in FIG. 6, the state S1 is set back to state S0 at block 620 before the method 600 returns to process further forward looking radar data at block 610.

Figure 7:
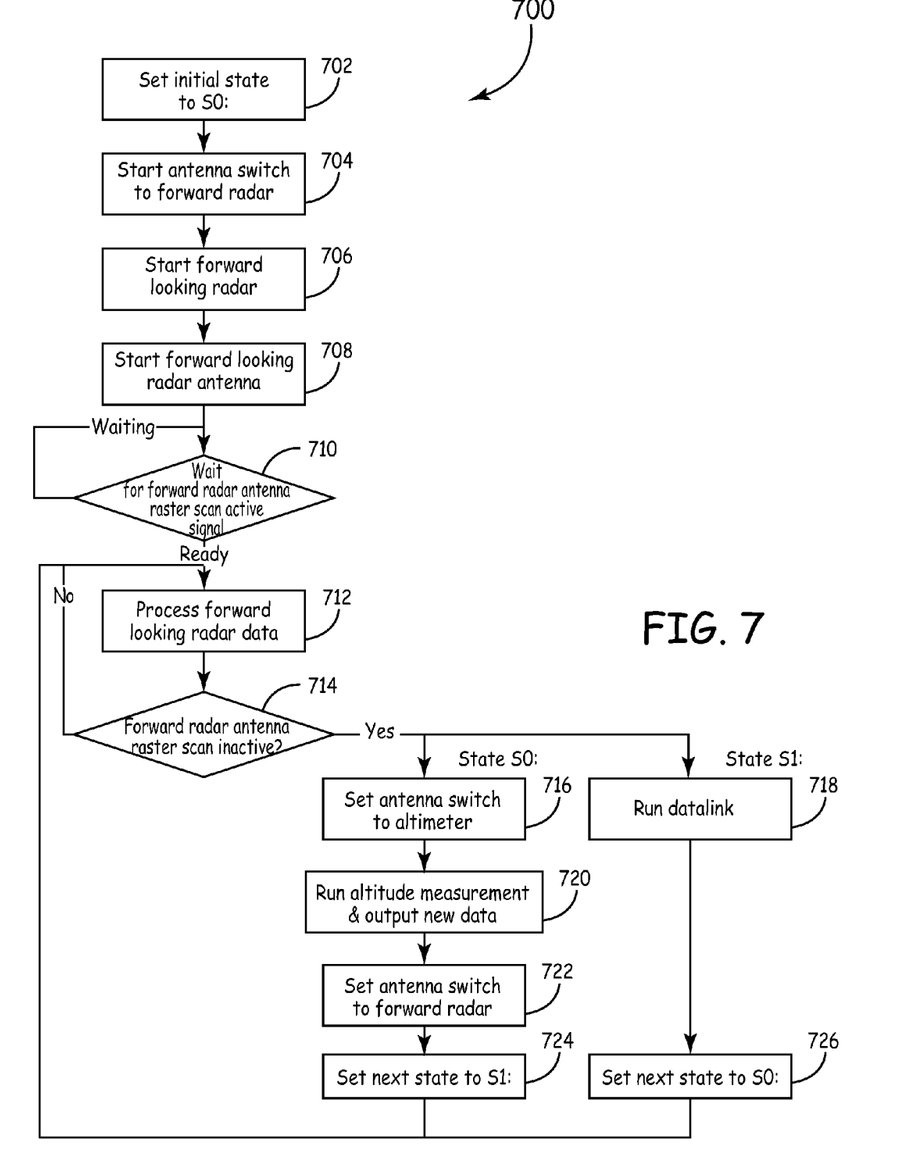
FIG. 7 is a flow diagram of an embodiment of a method for providing an aircraft with datalink communications and forward looking radar navigation.

FIG. 7 is a flow diagram of a method 700 for providing an electronic navigation device with datalink communications and forward looking radar. The method 700 addresses initializing a forward looking radar scan on an electronic navigation device associated with the aircraft, the electronic navigation device having at least a datalink communications transceiver, a radar altimeter, and a forward looking radar. Similar to the method discussed above with respect to FIG. 6, the method 700 addresses determining at least one operating state for the forward looking radar scan. For example, when the forward looking radar scan is in an inactive state, the method 700 performs at least one of an altitude measurement of the aircraft and a datalink transfer between the aircraft and at least one datalink source. In the method of FIG. 7, performing the altitude measurement and the datalink transfer in the inactive state further comprises switching signal connections between the radar altimeter and the forward looking radar based on an antenna switching output control signal.

For example, at an initial state S0 (block 702), the method 700 uses the antenna switching output control signal to set a radar scanning switch to transmit and receive signals from a forward looking radar (block 704) and starts the forward looking radar (block 706) and an associated forward looking radar antenna (block 708). The method 700 will wait until a forward radar antenna raster scan active signal is received by a signal processing unit associated with the electronic navigation device (block 710). Once the forward radar antenna raster scan active signal provides a "Ready" signal, the method 700 processes the forward looking radar data (block 712). The method 700 processes the forward looking radar data until a forward radar raster scan inactive signal is issued (block 714).

In one implementation, at state S0, the method 700 sets the radar antenna switch to the radar altimeter (block 716). The radar altimeter transmits and receives radar signals from one or more radar antennas for interpretation by the signal processing unit as a sample altitude measurement of the aircraft (block 720). The state S0 is set to state S1 at block 724, the radar antenna switch is set to forward looking (block 722) before the method 700 returns to process additional forward looking radar data at block 712. With the electronic navigation device in the S1 operating state, the method 700 performs the datalink transfer (block 718). In one implementation, the electronic navigation device provides at least one form of frequency conversion to accommodate datalink messages at multiple frequencies between the at least one datalink source and the electronic navigation device during the datalink transfer. At this point in the process depicted in FIG. 7, the state S1 is set back to state S0 at block 726 before the method 700 returns to process further forward looking radar data at block 712.

The methods and techniques described herein may be implemented in a combination of digital electronic circuitry and software (or firmware) residing in a programmable processor. An apparatus embodying these techniques may include appropriate input and output devices, a programmable processor, and a storage medium tangibly embodying program instructions for execution by the programmable processor. A process embodying these techniques may be performed by a programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, a processor will receive instructions and data from at least one of a read only memory (ROM) and a random access memory (RAM). In addition, storage media suitable for tangibly embodying computer program instructions and data include all forms of non-volatile memory, and include by way of example, semiconductor memory devices; magnetic disks such as internal hard disks and removable disks; magneto-optical discs; optical discs, and other computer-readable media. Any of the foregoing may be supplemented by, or incorporated in, specially-designed application-specific integrated circuits (ASICs).

When information is transferred or provided over a network or another communications connection (either hardwired, wireless, or a combination of hardwired or wireless) to a computer, a computer properly views the connection as a computer-readable medium. Thus, any such connection is properly termed a computer-readable medium. Combinations of the above are also included within the scope of computer-readable media.

This description has been presented for purposes of illustration, and is not intended to be exhaustive or limited to the embodiments disclosed. Variations and modifications may occur, which fall within the scope of the following claims.

What is claimed is:

1. A navigation system having a radar altimeter, comprising:
   a signal processing unit;
   one or more antennas in operative communication with the radar altimeter and the signal processing unit;
   a forward looking radar communicatively coupled to the radar altimeter; and
   wherein the forward looking radar and the signal processing unit are configured to provide forward looking radar measurements, radar altitude measurements from the radar altimeter, and datalink communications within a single forward looking radar scanning sequence.

2. The system of claim 1, wherein the forward looking radar and the signal processing unit are configured to provide the forward looking radar measurements and the datalink communications within at least one scan interval of the forward looking radar.

3. The system of claim 1, wherein the radar altimeter further comprises:
   a datalink communications transceiver in operative communication with the signal processing unit, the datalink communications transceiver operable to provide the datalink communications from at least a portion of the forward looking radar scanning area when the forward looking radar is not active;
   a radar signal transceiver in operative communication with the signal processing unit, the radar signal transceiver operable to transmit and receive radar return signals from the one or more antennas for interpretation by the signal processing unit; and
   wherein the datalink communications transceiver performs at least one datalink transaction where data is exchanged with an external datalink terminal and the radar signal transceiver performs at least one of the radar altitude measurements during the forward looking radar scanning sequence.

4. The system of claim 3, wherein the radar altimeter and the forward looking radar are configured to interleave the radar altitude measurements with the at least one datalink transaction on a return forward looking radar antenna scan of the radar altimeter.

5. The system of claim 3, wherein the datalink communications transceiver further comprises a frequency signal conversion module, the frequency signal conversion module operable to provide at least one form of communications data channel frequency adjustment for a communications data interface of the datalink communications transceiver.

6. The system of claim 1, wherein the signal processing unit is configured to receive a video input signal from the forward looking radar whereby the video input signal provides at least one three-dimensional video image for a near stand alone forward looking radar.

7. The system of claim 1, wherein the signal processing unit is configured to process radar and antenna control and timing configurations between the forward looking radar and the radar altimeter from a scanning antenna timing and control input/output signal.

8. The system of claim 1, and further comprising a radar antenna switch communicatively coupled between the radar altimeter and the forward looking radar, the radar antenna switch operable to switch signal connections between at least one of the antennas of the radar altimeter and a scanning antenna of the forward looking radar.

9. The system of claim 1, wherein the radar altimeter further comprises a data input/output module in operative communication with the signal processing unit.

10. The system of claim 9, wherein the data input/output module is communicatively coupled to at least one avionics system operable in an aircraft.

11. A method for providing an aircraft with datalink communications and forward looking radar navigation, the method comprising:
- initializing a forward looking radar scan on an electronic navigation device associated with the aircraft, the electronic navigation device having at least a datalink communications transceiver, a radar altimeter, and a forward looking radar;
- determining at least one operating state for the forward looking radar scan; and
- when the forward looking radar scan is in an inactive state, performing a datalink communications transfer between the aircraft and at least one datalink source using at least a portion of the circuitry of the radar altimeter in at least one state.

12. The method of claim 11, wherein initializing the forward looking radar scan of the electronic navigation device comprises:
- switching signal connections between the radar altimeter and the forward looking radar based on an antenna switching output control signal.

13. The method of claim 11, wherein determining the at least one operating state for the forward looking radar scan further comprises:
- receiving a video input signal from the forward looking radar whereby the video input signal provides at least one three-dimensional video image for a near stand alone forward looking radar during an active state of the forward looking radar scan.

14. The method of claim 11, wherein performing the datalink communications transfer comprises:
- performing an altitude measurement with the datalink communications transfer at the electronic navigation device on an interleaved radar return signal.

15. The method of claim 11, wherein performing the datalink communications transfer further comprises:
- transmitting and receiving radar return signals from one or more radar antennas communicatively coupled to the electronic navigation device for interpretation by a signal processing unit of the electronic navigation device; and
- providing at least one form of channel frequency conversion to accommodate datalink messages of varying frequencies between the at least one datalink source and the electronic navigation device.

16. An apparatus for aircraft navigation and communications data transfer, the apparatus comprising:
- means for initializing a forward looking radar scan on an electronic navigation device of an aircraft, the electronic navigation device having at least a datalink communications transceiver and a forward looking radar;
- means, responsive to the means for initializing, for determining at least one operating state of the forward looking radar scan; and
- means, responsive to the means for initializing and the means for determining, for alternating between receiving forward looking radar measurements and communications data within at least one inactive period of a scan interval of the forward looking radar scan.

17. The apparatus of claim 16, wherein the means for initializing the forward looking radar scan include means for receiving the forward looking radar measurements with the communication data in an interleaved radar return signal within at least one frequency band.

18. The apparatus of claim 16, wherein the means for initializing the forward looking radar scan further include means for receiving at least one sequence of return radar signals for a radar altimeter based on switching signal connections between the radar altimeter and a frequency converting forward looking radar.

19. The apparatus of claim 16, wherein the means for alternating between receiving include:
- means for providing a datalink transfer from at least a portion of a radar scanning area of the forward looking radar when the forward looking radar is inactive;
- means for transmitting and receiving radar altitude signals from one or more radar antennas communicatively coupled to the electronic navigation device for interpretation by a signal processing unit of the electronic navigation device; and
- means for transmitting and receiving forward looking radar signals from a forward looking scanning antenna to the electronic navigation device for interpretation by the signal processing unit of the electronic navigation device.

20. The apparatus of claim 16, wherein the means for alternating between receiving further include means for receiving a video input signal from the forward looking radar whereby the video input signal provides at least one three-dimensional video image during the forward looking radar scan.

* * * * *